United States Patent [19]

Nakahara et al.

[11] Patent Number: 4,740,443

[45] Date of Patent: Apr. 26, 1988

[54] ENCAPSULATED ELECTROSTATIC TONER WITH LOCALLY ATTACHED NON-MAGNETIC INORGANIC PARTICLES

[75] Inventors: Toshiaki Nakahara; Junichi Kurimoto; Yasuhide Goseki; Toshiyuki Koshio; Hisayuki Ochi, all of Tokyo; Hisayuki Ushiyama, Hiratsuka; Toru Matsumoto, Tokyo; Ichiro Ohsaki, Kawasaki; Katsutoshi Wakamiya, Yokohama; Masuo Yamazaki, Kawasaki, all of Japan

[73] Assignee: Canon Kabushiki Kaisha, Tokyo, Japan

[21] Appl. No.: 88,540

[22] Filed: Aug. 20, 1987

Related U.S. Application Data

[63] Continuation of Ser. No. 782,925, Oct. 2, 1985, abandoned.

[30] Foreign Application Priority Data

Oct. 8, 1984 [JP] Japan ............................ 59-209671
Oct. 8, 1984 [JP] Japan ............................ 59-209675

[51] Int. Cl.$^4$ .................................................. G03G 9/08
[52] U.S. Cl. ................................ 430/106.6; 430/110; 430/138

[58] Field of Search ............... 430/106.6, 107, 110, 430/138

[56] References Cited

U.S. PATENT DOCUMENTS 3,140,175  7/1964  Kaprelian .......................... 430/138
4,443,527  4/1984  Heikens et al. ............ 430/106.6 X

FOREIGN PATENT DOCUMENTS 58-100855  6/1983  Japan ............................ 430/138
58-136050  8/1983  Japan ............................ 430/138
59-26139   2/1984  Japan ............................ 430/138

*Primary Examiner*—Roland E. Martin
*Attorney, Agent, or Firm*—Fitzpatrick, Cella, Harper & Scinto

[57] ABSTRACT

An encapsulated toner for development of electrical latent images comprises a core particle containing a colorant and a soft solid material, inorganic fine particles attached to the vicinity of the surface of the core particle, and a shell coating the core particle and the inorganic fine particles. The inorganic fine particles function to, e.g., reinforce the encapsulated toner with a thin shell and may be attached to the core particles through dry-mixing. The core particles with the attached inorganic particles may be coated with a shell resin through phase separation.

27 Claims, 2 Drawing Sheets

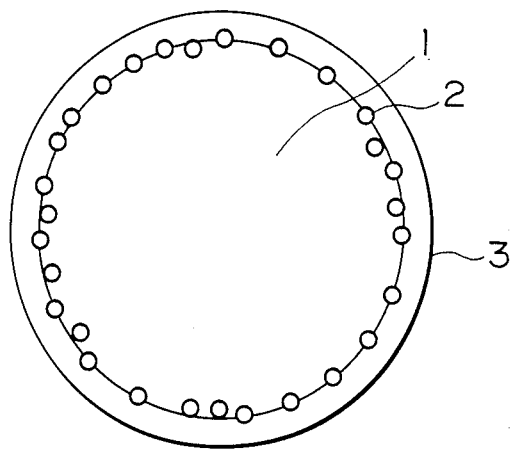
F I G. 1

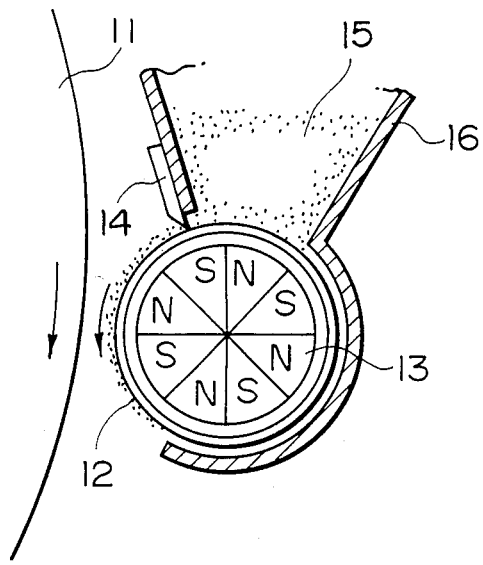
F I G. 2
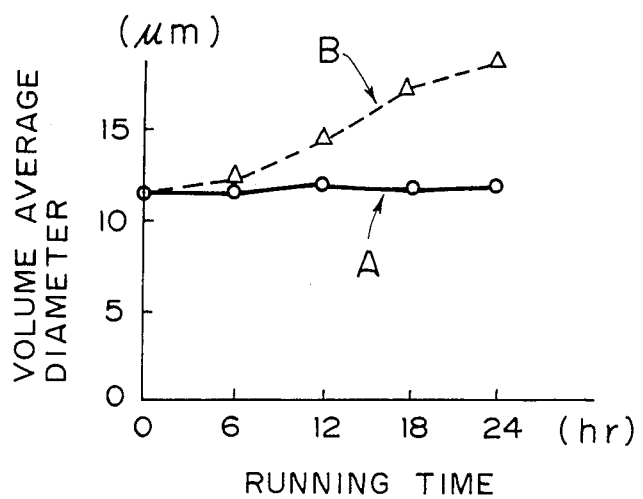
F I G. 3

ENCAPSULATED ELECTROSTATIC TONER WITH LOCALLY ATTACHED NON-MAGNETIC INORGANIC PARTICLES

This application is a continuation of application Ser. No. 782,925 filed Oct. 2, 1985, now abandoned.

FIELD OF THE INVENTION AND RELATED ART

This invention relates to an encapsulated toner to be used for development of electrical latent images in electrophotographic process, electrostatic printing process or magnetic recording process, more particularly to a microcapsule toner which can be fixed with small energy consumption.

Hitherto, such a process as electrophotography, electrostatic printing or magnetic recording has widely been utilized for recording or copying of a large amount of information.

The electrophotographic process generally comprises steps of forming electrical latent images on a photosensitive member comprising a photoconductive material through utilization of its photoconductivity, then developing the latent images by use of a toner, optionally transferring the toner image onto a transfer material such as paper, and fixing the image to obtain a copy.

The electronic printing process is a process for printing which comprises leading charged powdery toner through utilization of an electrical field onto a recording material and fixing the toner thereon, as disclosed in Japanese Patent Publication No. 14342/1967. The electrostatic recording process comprises imparting images of charges onto a dielectric layer and attaching charged powdery toner thereto to effect fixing. The magnetic printing process is a process, which comprises forming magnetic latent images on a latent image bearing member, developing the latent images with toner powder containing a magnetic material and fixing the toner image thus obtained after transfer onto a recording material.

According to the processes as described above, for enabling permanent storage of the toner image obtained, the operation of fixing the image onto a recording medium such as paper is conducted. For fixing of the toner image, a means for consuming energy such as heat or pressure is employed. As the energy consumption required for fixing is smaller, the equipment for fixing can be made simple, safety concerns can be decreased and the maintenance interval can be prolonged. Even in such a case, the toner is required to stand the mechanical pressure accompanied during transportation onto the latent image or the heat from the heat generating portion such as the fixing system and the driving system in the developing step without changing its developing characteristics, and also to maintain its performance during storage.

Lowering of the melting point of toner or employment of a soft material for toner for making the fixing easier is of itself limited with respect to durability. As an approach to overcoming such a limitation, there is a proposal of a (micro)capsule toner or (micro)encapsulated toner comprising soft core particles coated therearound with a rigid resin. However, such a microcapsule toner, while exhibiting high resistance to static pressure and exhibiting its function well during storage, is brittle against dynamic pressure, will be broken gradually through friction, particularly exhibiting a tendency to be broken within a short term when the thermal environment is either a lower temperature or higher temperature. Increase in thickness of the outer shell for imparting sufficient strength against friction will deteriorate the fixing characteristic. For obtaining a microcapsule with a large shell thickness, it will take a long time for encapsulation according to the microencapsulation method known in the art, or in the case of the toner with very minute sizes of some few $\mu$ to some tens $\mu$, agglomerated mass or particles of only a free shell material may be formed to lower the performance of the toner. Accordingly, it would be desirable to develop a microcapsule toner which is covered with a thin shell material which will not impair fixing characteristics and is also high in strength.

SUMMARY OF THE INVENTION

An object of the present invention is to provide an encapsulated toner which has overcome the problems as described above.

Another object of the present invention is to provide an encapsulated toner which will hardly be deteriorated if subjected to friction for a long time.

Still another object of the present invention is to provide an encapsulated toner which can be fixed with little energy.

Still another object of the present invention is to provide an encapsulated toner which is good in free-flowing property without causing caking during storage.

It is also another object of the present invention to provide an encapsulated toner having good fixing characteristic onto plain paper under lower pressure than in the prior art, with little reduction of the external additives in the free particle form added to the encapsulated toner such as the free-flowability imparting agent even after copying a large number of sheets, thus giving stable image density and stable image quality to exhibit its intended action in a stable manner.

Further, another object of the present invention is to provide an encapsulated toner which can maintain its initial characteristics even when used continuously for a long term with little toner agglomeration or change in charging characteristic.

Still another object of the present invention is to provide an encapsulated toner which can give an image of a clear color.

A further object of the present invention is to provide an efficient process for producing such encapsulated toners as mentioned above.

The encapsulated toner according to the present invention has been developed in order to accomplish the above objects and comprises core particles and a shell covering the core particles, with inorganic fine particles being present in the vicinity of the surface of the core particles.

The process for producing the encapsulated toner of the present invention comprises mixing resinous core particles with inorganic fine particles to have the inorganic fine particles attached (including the form of being embedded) onto the core particle surfaces and coating the core particles with the inorganic fine particles attached thereto with a shell resin.

More specifically, the present invention provides an encapsulated toner for development of electrical latent images, comprising a core particle containing at least a colorant and a soft solid material, inorganic fine particles attached to the vicinity of the surface of the core particle, and a shell coating the core particle and the inorganic fine particles.

The present invention further provides a process for producing an encapsulated toner for development of electrical latent images, which comprises forming core particles from a mixture containing at least a colorant and a soft solid material, mixing the core particles thus formed with inorganic fine particles to form core particles each having the inorganic fine particles in the vicinity of the surface thereof, and coating the surfaces of the core particles having the inorganic fine particles attached thereto with a shell material according to the phase separation method.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of the encapsulated toner of the present invention;

FIG. 2 is a schematic sectional view of the essential part of the developing apparatus used for evaluation of the durability of the magnetic encapsulated toner according to the Examples of the present invention and Comparative Examples; and FIG. 3 is a graph showing the change in the encapsulated toner particle size during the successive copying test.

DETAILED DESCRIPTION OF THE INVENTION

The microcapsule toner of the present invention, which is provided with inorganic fine powder 2 in the vicinity of the surface of the core particle 1 as schematically shown in FIG. 1, can be enhanced in rigidity as well as heat resistance and therefore is resistant even with a very thin shell 3 to stirring during storage or development, or friction in the course of conveying and further to frictional heat or the heat generated from the equipment, whereby the form of the encapsulated toner and its function can be well maintained. Because the thinner shell thickness is not an obstacle against uniform pressurization, and since the core material of the present invention interferes little with the free-flowing property during pressurization, the energy consumption for fixing can be suppressed at a low level.

As the core material to be used in the present invention, it is possible to utilize a soft solid material which can exhibit a preferable fixing characteristic. Such materials may include waxes (paraffin wax, beeswax, carnauba wax, microcrystalline wax, etc.), higher fatty acids (stearic acid, palmitic acid, lauric acid, etc.), higher fatty acid metal salts (aluminum stearate, lead stearate, barium stearate, magnesium stearate, zinc stearate, zinc palmitate, etc.), higher fatty acid derivatives (methylhydroxy stearate, glycerol monohydroxystearate, etc.), polyolefins (low molecular weight polyethylene, low molecular weight polypropylene, polyethylene oxide, polyisobutylene, polytetrafluoroethylene, etc.), olefin copolymers (ethylene-acrylic acid copolymer, ethylene-acrylate copolymer, ethylene-methacrylic acid copolymer, ethylene-methacrylate copolymer, ethylene-vinyl chloride copolymer, ethylene-vinyl acetate copolymer, ionomer resin, etc.), graft products obtained by grafting a monomer having a plar group (amino group, alkylamino group, etc.) onto low molecular weight polyolefins, styrene resins (low molecular weight polystyrene, styrene-butadiene copolymer (monomer weight ratio: 5-30:95-70), styrene-acrylic compound copolymer, etc.), epoxy resins, polyester resins (with acid values of 10 or less), rubbers (isobutylene rubber, nitrile rubber, chlorinated rubber, etc.), polyvinyl pyrrolidone, polyamide, coumarone-indene resin, methyl vinyl ether-maleic anhydride copolymer, maleic acid-modified phenol resin, phenol-modified terpene resin, silicone resin, and so on. These can be used individually or in combination. In the soft solid material to be contained in the core particles, it is preferable to incorporate 30 wt. % or more, preferably 50 to 95 wt. % of a wax or low molecular weight polymer exhibiting a melt viscosity at 100° C. of 1 to 100 cps, preferably 1 to 30 cps.

In the core material for the capsule toner of the present invention, a colorant is contained, and various dyes and pigments are included as the colorant. For such dyes and pigments, it is possible to apply, for example, Carbon black, Nigrosine dyes, Lamp black, Sudan black SM, Fast yellow G, Benzidine yellow, Pigment yellow, Indofast orange, Irgazine red, Paranitroaniline red, Toluidine red, Carmine FB, Permanent bordeau FRR, Pigment orange R, Lithol red 2 g, Lake red C, Rhodamine FB, Rhodamine B lake, methyl violet B lake, Phthalocyanine blue, Pigment blue, Brilliant green B, Phthalocyanine green, Oil yellow GG, Zapon fast yellow CGG, Kayaset Y 963, Kayaset YG, Smiplast yellow GG, Zapon fast orange RR, Oil scarlet, Smiplast orange G, Orazol brown B, Zapon fast scarlet CG, Aizenspiron red BEH or Oil pink OP.

When the encapsulated toner is to be used as the magnetic encapsulated toner, magnetic powder is mixed into the core material. As the magnetic powder, a material which can be magnetized when placed in a magnetic field can be employed, and there may be included powder of a ferromagnetic metal such as iron, cobalt, nickel, etc., or alloys or compounds such as magnetite, hematite, ferrite, etc. The content of these magnetic powders may be 15 to 70% by weight, preferably 20 to 50% by weight, based on the encapsulated toner weight.

For the purpose of improving dispersibility and humidity resistance of the magnetic powder in the core particles, it is preferable to use magnetic powder subjected to the hydrophobicity-imparting treatment. Hydrophobicity-imparting treatment may be carried out by use of 0.01 to 5 parts by weight of a treating agent such as titanium coupling agents, silane coupling agents, aluminum coupling agents, etc. per 100 parts by weight of the magnetic powder. Hydrophobicity-imparting treatment may generally be practiced by stirring the dried magnetic powder in various mills, adding dropwise a coupling agent dissolved in a solvent in which the coupling agent is soluble, such as toluene, benzene, etc., to be mixed and reacted with the magnetic powder, followed by evaporation of the solvent and the reaction by-product.

As the method for granulation of the core material of the capsule toner of the present invention, the conventional crushing method is not preferable, because the core material binder is soft or has a low melting point to readily cause fusion, whereby crushing is required to be performed under cooling. It is preferable to use a method in which the above binder and the colorant mixed under molten state are sprayed and cooled or a method in which the materials are formed into particles by suspension into hot water, followed by solidification by cooling. The core particles obtained by such a method will become approximately to spherical, which is also reflected in the shape of the capsule toner finally obtained to give a capsule toner with good durability against friction. The core particles may preferably have sizes of 1 to 50 μm, more preferably 5 to 20 μm.

In the present invention, inorganic fine particles are externally added and mixed with the core particles as prepared above, thereby to have the inorganic fine particles attached onto the surfaces of core particles.

The inorganic fine particles to be used in the present invention may include powder or particles of inorganic materials such as alumina, titanium dioxide, barium titanate, magnesium titanate, calcium titanate, strontium titanate, zinc oxide, siliceous sand, clay, mica, wollastonite, diatomaceous earth, various inorganic oxide pigments, chromium oxide, cerium oxide, red iron oxide, antimony trioxide, magnesium oxide, zirconium oxide, barium sulfate, barium carbonate, calcium carbonate, fine silica powder, silicate, silicon carbide, silicon nitride, boron carbide, tungsten carbide, titanium carbide, molybdenum disulfide, etc. As the inorganic fine particles, non-magnetic materials are generally employed. These inorganic fine powder should preferably have hydrophobic groups on the surface, preferably including those treated with a hydrophobicity-imparting agent such as a silane coupling agent, a titanium coupling agent, silicone oil or a silicone oil having amine in the side chain. As the inorganic fine particles, there may be used those having more minute sizes than the core particles, preferably those having a specific surface area according to the BET method by $N_2$ adsorption of 0.5 to 500 $m^2/g$, preferably 5 to 400 $m^2/g$. Further, the inorganic fine particles to be employed should preferably be insoluble in water and organic solvents to exhibit resistance thereto, and have thermal stability to temperatures up to 300° C.

In the present invention, these inorganic fine particles are attached by dry mixing with the core particles, preferably under heating (e.g., under heating at about 40° to 50° C.) by means of a powder mixing or pulverizing machine such as coffee mill, pulverizer, Henschell mixer, etc. The core particles attached with the inorganic fine powder are subsequently encapsulated. The amount of the inorganic fine powder added may be 0.01 wt. % or more, preferably 0.1 to 10 wt. %, particularly preferably 0.2 to 5 wt. %, based on the weight of core particles. By such an external addition and mixing operation, the inorganic fine particles are attached on the surfaces or embedded in the surface layers of the core particles.

Even by such an external addition and mixing operation, some inorganic fine particles may not be attached to the core particles but remain merely as free particles mixed with the core particles, but such unattached inorganic fine particles can also be incorporated into the shell material during the subsequent encapsulation operation to serve for reinforcement of the shell, and therefore the externally added mixture as prepared above may be supplied as such for the encapsulation step.

The vicinity or surface layers of the core particle surfaces in the present invention refer to the region where the inorganic fine particles can be embedded or semi-embedded in the core particles by mixing of the core particles with the inorganic fine particles, specifically the surface layer portion to the depth of 1/5 or less, preferably 1/10 or less, of the core particle diameter from the surface. It is preferred that 90 wt. % or more, particularly 95 wt. % or more of the inorganic fine particles should be present locally in the vicinity of the core particle surfaces.

The core particles to which the inorganic fine particles have been attached as obtained above are respectively coated with a shell.

As the shell material, known resins are available, and the resins comprising the monomers as set forth below may be employed: styrene and substituted derivatives thereof such as styrene, p-chlorostyrene, p-dimethylaminostyrene, etc.; esters of acrylic acid or methacrylic acid such as methyl acrylate, ethyl acrylate, butyl acrylate, methyl methacrylate, ethyl methacrylate, butyl methacrylate, N,N-dimethylaminoethyl methacrylate, etc.; maleic anhydride or half-ester, half-amide or diesterimide of maleic anhydride; nitrogen-containing vinyl compounds such as vinyl pyridine, N-vinylimidazole, etc.; vinyl acetal such as vinyl formal, vinyl butyral, etc.; vinyl monomers such as vinyl chloride, acrylonitrile, vinyl acetate, etc.; vinylidene monomers such as vinylidene chloride, vinylidene fluoride, etc. It is also possible to use a homopolymer, a copolymer or a mixture thereof such as polyester, polycarbonate, polysulfonate, polyamide, polyurethane, polyurea, epoxy resin, rosin, modified rosin, terpene resin, phenol resin, aliphatic or alicyclic hydrocarbon resin, aromatic petroleum resin, melamine resin, polyether resin such as polyphenylene oxide, or thioether resin.

For obtaining an encapsulated toner having these polymers as the outer shell, various encapsulation techniques may be utilized, but the phase separation method may preferably be employed in the present invention.

The phase separation method which can preferably be employed in the present invention refers to a method, which comprises dissolving a shell material in a solvent with good solubility in which the shell material high solubility shows but the soft solid material for forming the core particles of the capsule toner shows very low solubility or substantial insolubility, dispersing the core particles in the solution having the shell material dissolved in the solvent to prepare a dispersion, and adding gradually to the dispersion prepared a solvent with poor solubility which can be homogeneously mixed with the above solvent with good solubility but has poor dissolving power for the shell material thereby to precipitate the shell material on the core particle surfaces, thereby to form shells coating the core particles.

As the solvent with good solubility, for example, dimethylformamide may be employed, while, as the solvent with poor solubility, for example, water, methyl alcohol, ethyl alcohol or hydrocarbons with 5 to 8 carbon atoms may be employed.

The encapsulated toner of the present invention thus obtained has a shell with a thickness of 0.05 to 1.0μ, preferably 0.1 to 0.6μ, and is in the form of microcapsules with a volume average particle size of 1 to 50μ, preferably about 5 to 20μ, in which inorganic fine particles are present in the vicinity of the surfaces of the core particles.

The encapsulated toner of the present invention should preferably have an insulating property in terms of volume resistivity of $10^{10}$ ohm.cm or higher, particularly $10^{12}$ ohm.cm or higher. The volume resistivity as herein mentioned is defined as the value calculated from the current value measured one minute after application of an electrical field of 100 V/cm to a molded toner molded under a pressure of 100 kg/cm$^2$.

The encapsulated toner of the present invention, as previously described, can further be externally added and mixed with external additives for electrophotography such as carbon black, various dyes and pigments, hydrophobic colloidal silica, etc. for the purpose of charge controllers, agents for imparting free-flowing property, colorants, etc., and the addition effects thereof can stably be exhibited. These external additives should suitably be added in amounts of about 0.1 to 5 parts by weight per 100 parts by weight of the encapsulated toner.

According to the present invention, by coating the core particles to which inorganic fine particles have been attached by external addition and mixing with a resinous shell, an encapsulated toner can be obtained in which inorganic fine particles can be held firmly to exhibit the effects thereof stably over a long term.

The encapsulated toner of the present invention is resistant to stirring during storage or for development or frictional force in the conveying process, frictional heat and the heat emitted from equipments, whereby the essential form and function of the toner can be maintained stably. Further, it had a very useful characteristic that the energy consumption for fixing can be suppressed at a low level.

Further, the present invention is advantageously applied to the encapsulated toner for the developing method employing a photosensitive member having an organic photoconductive material. Photosensitive members employing organic photoconductive material (herein abbreviated as OPC photosensitive members) are superior to photosensitive members employing inorganic photoconductive materials such as selenium, cadmium sulfide, zinc oxide or amorphous silicon with respect to film forming property, light weight, etc. Hitherto, problems have been involved with respect to sensitivity, but improvements including those in respect of sensitivity to visible light, charge retentive force and surface strength have been attained by employment of an electrophotographic photosensitive member having a photosensitive layer with a laminated structure in which the photosensitive layer is separated in functions into a charge generation layer and a charge transport layer. Such electrophotographic photosensitive members are disclosed in, for example, U.S. Pat. Nos. 3,837,851 and 3,871,882.

However, since the charge transport layer for forming the surface of the OPC photosensitive member employing an organic photoconductive material contains a charge transport material and a polymeric binder for film formation, it has a high affinity with the toner or the encapsulated toner employing an organic resin binder, whereby there arises a problem that the toner will more readily adhere onto the OPC photosensitive member surface as compared with an inorganic photosensitive member such as selenium or amorphous silicon. Particularly, when a pressure fixable toner is to be employed, since a soft material is necessarily used, the phenomenon of adhesion of the toner onto the photosensitive member surface can occur frequently.

The encapsulated toner of the present invention has a form in which the core particles attached with inorganic fine particles having an abrasive characteristic in the vicinity of the surfaces of the core particles are coated with a shell. Therefore, the abrasive inorganic particles are effectively utilized while being firmly held and also function to reinforce the microcapsule toner. As a result, fusion of the encapsulated toner through destruction of the encapsulated toner on the OPC photosensitive member or the phenomenon of filming does not occur readily, or, even if such phenomenon may occur, it is possible to effectively remove the ill effects thereof on the developing characteristics by effective utilization of the abrasive characteristic of the inorganic fine particles.

As abrasive inorganic fine particles, metal oxides, nitrides and carbides may preferably be employed. Typical examples may include metal oxides such as silica, tin oxide, cerium oxide, zirconium oxide, titanium dioxide, zinc oxide, aluminum oxide, iron sesquioxide, calcium titanate, strontium titanate, barium titanate; nitrides such as tri-titanium tetranitride, boron nitride, silicon nitride, titanium nitride; carbides such as boron carbide, silicon carbide, tungsten carbide, titanium carbide, etc. The abrasive inorganic fine particles in the present invention, in addition to the function to reinforce the encapsulated toner, have another principal function. Thus, even when a part of the encapsulated toner particles are broken to cause filming or fusion on the photosensitive member in the steps of development, transfer or cleaning on the photosensitive member before fixing of the image, the filming or fusion of the toner can be removed through the action of the abrasive inorganic fine particles especially in cooperation with a cleaning means. As the cleaning means, blade cleaning is preferred, and an elastic rubber such as urethane rubber is preferred as a material for the cleaning blade.

The present invention is described in more detail by referring to the following Examples and Comparative Examples.

EXAMPLE 1

As the core material, 20 parts of Hiwax 200 P (produced by Mitsui Sekiyu Kagaku K.K.), 80 parts of Paraffin wax 155 (produced by Nippon Seiro K.K.; melt viscosity at 100° C. of 6.4 cps) and 5 parts of Phthalocyanine Blue were mixed under melting at 150° C., granulated by a spray dryer and classified in a dry system to obtain spherical core particles with particle sizes of 10.3±5.0μ.

On the other hand, while stirring 100 parts by weight of fine silica particles synthesized according to the dry process (specific surface area: about 130 m$^2$/g), 12 parts by weight of an amino-modified silicone oil having amine in the side chain (viscosity at 25° C. of 70 cps, amine equivalent: 830) was sprayed and the product was held at about 250° C. for 60 minutes.

The thus treated fine silica powder in an amount of 20 g was externally added to and mixed with 1 kg of the above mentioned core particles by means of a Henscell mixer Model 10B (produced by Mitsui Miike Seisakusho K.K.) under the conditions of a temperature of 45° C., a rotation scale of 10 (about 3300 to 3500 rpm) for 4 minutes. Then, the above externally added and attached mixture of the core particles and the treated fine silica powder was coated with a styrene-dimethylaminoethyl methacrylate (molar ratio: 90/10) to a film thickness of about 0.4μ according to the phase separation method from an organic solution, i.e. by dispersing the core particles in a dimethylformamide solution having the shell material dissolved therein and gradually adding water to the dispersion, to obtain encapsulated particles. To 100 g of the resultant encapsulated particles was further added externally at room temperature 1.0 g of fine silica powder treated with the above mentioned amino-modified silicone oil, followed by mixing, to obtain an encapsulated toner. The encapsulated toner was sliced by means of a microtome and observed by a transmission type electron microscope. As the result, it was confirmed that, in addition to the silica on the shell surface, the fine silica powder was present at the interface between the core and the shell of the encapsulated toner and also innerside (in the vicinity of the surface) of the core particles.

A mixture of 12 g of the capsule toner thus obtained and 88 g of a carrier (EFV 250/400 produced by Nippon Teppun K.K.) was used as the developer to develop a latent image having negative electrostatic, and the developed toner image was transferred onto a wood-free paper. The paper having the toner image was passed through a pressure fixing machine comprising two pressure rollers so that pressure contact force could be applied from both ends thereof, whereby substantially complete fixing characteristic was exhibited under a line pressure of 10 kg/cm, and a clear and good reversal image with an image density of 1.6 without fog could be formed. Further, when successive copying test was conducted for 3,000 sheets with a manuscript of A4 size, good images with an image density of 1.4 or higher and without fog could be obtained stably.

When the toner surfaces before and after successive copying test were observed by a scanning type electron microscope, no significant difference could be recognized in amount of the silica externally added to the encapsulated toner.

COMPARATIVE EXAMPLE 1

The same procedures as in Example 1 were repeated except that no fine silica powder treated with the amino-modified silicone oil was mixed by external addition with the core particles.

The images obtained at the initial stage of copying were similar to those obtained in Example 1, and clear reversal images with an image density of 1.5 without fog were formed, with the fixing characteristic being also good. However, in successive copying test for 3,000 sheets, the density became lowered with the number of sheets successively copied (image density 1.0), until fogging occurred. Filming onto the surface of the photosensitive member and slight fusion at both ends of the developing sleeve were observed. When the toner surface was observed by a scanning type electron microscope, it was clearly observed that the amount of silica externally added was reduced after successive copying test as compared with before.

EXAMPLE 2

An encapsulated toner was prepared according to the same procedures as in Example 1 except for employing titanium oxide (average particle size: $0.1\mu$, BET specific surface area: 20 $m^2/g$) treated with 5 wt. % of isopropoxytitanium triisostearate (TTS produced by Nippon Soda K.K.) in place of the fine silica powder treated with the amino-modified silicone oil as the external additive to the core particles in Example 1. When the same copying test as in Example 1 was conducted, good results could be obtained. The amount of silica externally added to the encapsulated toner was found to be slightly reduced after the successive copying test, but without any influence on copying performance.

EXAMPLE 3

An encapsulated toner was prepared according to the same procedures as in Example 1 except for employing silicon carbide treated with 3 wt. % of isopropoxytitanium isostearate (average particle size: $0.38\mu$, BET specific surface area: 10 $m^2/g$) in place of the fine silica powder treated with the amino-modified silicone oil as the external additive to the core particles in Example 1.

EXAMPLE 4

A pre-dispersion of 30 parts by weight of a low molecular weight polyethylene wax (a molecular weight: 3000, melt viscosity at 100° C.: 6.4 cps), 70 parts by weight of a 155° F. paraffin wax and 70 parts by weight of $Fe_3O_4$ was dispersed, mixed and kneaded in an attritor at 140° C. Then, the molten mixture obtained was sprayed into the air of 50° C. through a dual-fluid nozzle by use of the air of 180° C. and recovered by a cyclone to obtain spherical magnetic core particles of 1 to 20 $\mu m$.

1000 parts by weight of the above core particles and 20 parts by weight of titanium oxide (BET specific surface area 39.7 $m^2/g$, particle size 0.04 $\mu m$) were mixed under stirring by means of a Henscell mixer Model 10B (produced by Mitsui Miike Seisakusho K.K.) at a rotation scale of 10 for 2 minutes. Then, 100 parts by weight of the mixture was dispersed into a solution of 10 parts by weight of a dimethylaminoethyl methacrylate-styrene copolymer (copolymer ratio: 10:90; molecular weight: 25,000) dissolved in 400 parts by weight of dimethylformamide (abbreviated as DMF), and water was added thereto under stirring to effect phase separation of the dimethylaminoethyl methacrylate-styrene copolymer to enclose the core particles, followed by further addition of water to effect hardening to finally obtain encapsulated toner single particles containing 25 wt. % of titanium oxide and having a shell layer with a thickness of about 0.4 $\mu m$.

The toner obtained exhibited positive chargeability and was packed in a developing apparatus of an electrophotographic copying machine PC-12 (produced by Canon K.K.) equipped with an OPC photosensitive member and a urethane rubber blade cleaning member. As the result of image formation, transferred images of high image density were obtained, which were clear and without fog.

When the fixing characteristic of the unfixed image was tested, it was found to be pressure-fixable under a line pressure of 12 kg/cm, and also heat-fixable sufficiently at 80° C. when left to stand in a thermostat tank. Here, fixing characteristic was evaluated by determining the point where the difference in toner image density before and after one reciprocal sliding of the fixed image on a wood-free paper under a weight of 50 g having the bottom area of 1 $cm^2$ through a sheet of plain paper ("Silbon" paper C available from Haga Yoshiten K.K.) with a basis weight of 20 $g/cm^2$ became 5% or less as the fixing point.

The structure of the developing section of the developing apparatus employed may schematically be shown as in FIG. 2. The distance between the drum 11 and the sleeve 12 was 300 $\mu m$, the distance between the sleeve 12 and the blade 14 was 100 $\mu m$, and the fixed magnet 13 employed exhibited 650 Gauss at the maximum at the portion confronted with the blade 14. The sleeve 12 rotated in the same direction as the drum 1 at a speed of 66 mm/sec. Between the drum 11 and the sleeve 12, an AC bias with a frequency of 16 KHz and a Vp-p (peak to peak voltage) of 1.3 KV and a DC bias of −400 V were applied, and an electrostatic image of −700 V at the dark portion was formed on the photosensitive member on the drum 11.

As the successive copying test, copying operation was repeated through a white paper manuscript under substantially no toner consumption, and the toner was sampled every 6 hours for examination of the particle size by means of a Coulter Counter Model TA-II (produced by Coulter Counter Co.). As the result, as shown in the curve A in FIG. 2, there was substantially no change in particle size from the initial stage to even after 24 hours, and, when an image manuscript was copied, image was found to maintain the same sharpness and image density as in the initial stage. No fusion of particles was observed at the sealing portion nor on the developing sleeve in the developing apparatus.

When the toner was packed to a thickness of 500 mm in a cylinder of 50 mm in diameter and left to stand at 50° C. for one week, no caking was observed and good images could be obtained by performing the same copying operation as described above by use of this toner.

COMPARATIVE EXAMPLE 2

Except for using no titanium oxide, Example 4 was repeated to obtain an encapsulated toner. When image formation was effected by use of this capsule toner similarly as in Example 4, the image obtained at the initial stage was clean and had a high image density without fog. As to the fixing characteristic, pressure fixing was possible under a line pressure of 12 kg/cm and exhibited satisfactory heat fixing characteristic at 80° C., thus showing no difference from the encapsulated toner of Example 4.

When successive copying test was conducted similarly as in Example 4 by use of this encapsulated toner, fusion products of the encapsulated toner became prominent at the site contacting the rotating sleeve 2 of the sealing portion in the developing apparatus after about 6 hours, until rotation of the sleeve became no more smooth after 24 hours even resulting in contact of the sleeve with the latent image bearing drum through the fused encapsulated toner at the sleeve end portions, whereby normal gap could not be maintained. The developability of the encapsulated toner was also found to be deteriorated, whereby the image density was also lowered to give a coarse image. Among the encapsulated toners in the hopper, fused toner products which could not pass through a screen of 100 mesh were observed. There was also formed a portion in the form of a streak at which coating of the toner was absent on the developing sleeve.

The change in particle size of the toner on the sleeve in the hopper as determined by Coulter Counter is shown as the curve B in FIG. 3. Measurement of particle size was carried out after throwing the toner samples into a saline water containing a surfactant and causing dispersion under application of ultrasonic wave for 5 seconds.

The toner with a volume average particle size of 11.5 μm at the start was increased up to 18.7 μm after 24 hours, but returned to the initial particle size when the ultrasonic dispersion time was extended to 5 minutes or longer. By addition of a free-flowing agent such as hydrophobic colloidal silica into the toner within the hopper and mixing with a Henschell mixer, the particle sizes could be returned to the original except for a part of fused products, but the developability deteriorated could no longer be restored.

EXAMPLES 5-9

Encapsulated toners were obtained similarly as in Example 4 except for employing alumina, zirconia, silicon carbide, titanium nitride and boron nitride in place of titanium oxide. The characteristics of the respective encapsulated toners and the results of the copying tests are shown in Table 1. In Table 1, the results of Example 4 and Comparative Example 2 are also shown.

TABLE 1

| | Weight ratio based on 100 g cores (%) | | Physical properties of inorganic fine particles | | Volume average size | | Image density | |
|---|---|---|---|---|---|---|---|---|
| | Inorganic fine particles | Outer shell | Average particle size (μm) | BET specific surface area (m²/g) | Initial (μm) | After 22 hrs. (μm) | Initial | after 24 hrs. |
| Example | | | | | | | | |
| 4 | Titanium oxide (2%) | *(10%) | 0.04 | 39.7 | 11.5 | 12.0 | 1.50 | 1.47 |
| 5 | Alumina (0.5%) | " | 0.20 | 13.5 | 11.8 | 12.4 | 1.53 | 1.50 |
| 6 | Zirconia (5%) | " | 0.028 | 10 | 11.9 | 12.3 | 1.49 | 1.43 |
| 7 | Silicon carbide (1%) | " | 0.083 | 22.5 | 12.0 | 12.1 | 1.51 | 1.49 |
| 8 | Titanium carbide (1%) | " | 0.077 | 16 | 11.9 | 11.9 | 1.48 | 1.42 |
| 9 | Boron nitride (0.5%) | " | 0.5 | 4 | 12.2 | 12.2 | 1.45 | 1.46 |
| Comparative Example 2 | — | " | — | — | 11.5 | 18.7 | 1.53 | 0.68 |

*Dimethylaminoethyl methacrylate-styrene copolymer

EXAMPLE 10

| | |
|---|---|
| Microcrystalline wax (m.p. 92° C.) | 40 wt. parts |
| Paraffin wax (m.p. 65° C.) | 60 wt. parts |
| Carbon Black (Raven 3500) | 4 wt. parts |
| Magnetite subjected to hydrophobicity treatment (treated by an AL-type coupling agent (trade name: AL-M, produced by Ajinomoto K.K.)) | 55 wt. parts |

The above mixture was melted and mixed by means of an MKM mixer (produced by Odawara Seisakusho K.K.), thrown into an attritor (produced by Mitsui Miike Seisakusho K.K.) heated to 120° C. and dispersed at 200 rpm for 5 hours and thereafter further dispersed with addition of 7 wt. parts of N-dodecyldimethylamine for 30 minutes to prepare a molten product.

Into a 20-liter Agihomomixer (produced by Tokushu Kika K.K.), 20 liter of water and 40 g of silica (Aerosil #200) were charged and the mixture was heated by a heating jacket to 95° C. to prepare a dispersing medium. Into the resultant medium was thrown 2 kg of the above molten product, and granulation was carried out under stirring at a circumferential speed of 20 m/sec to obtain fine particles with a number average particle size of 7.6 $\mu$m and a weight average particle size of 12.3 $\mu$m after about 30 minutes. These particles were quenched by throwing into a vessel containing 30 kg of ice, followed further by addition of 400 g of caustic dosa into the liquid, and the mixture was stirred for 24 hours. Then, filtration and washing with water were repeated by means of a centrifugal machine, residual silica and caustic soda in the dispersion were removed and the residue was dried by an air dryer at 40° C. to obtain core particles.

The surface and the cut specimen of the core particle were observed by an electron microscope to find that there was no magnetic material on the surface but the magnetic material was sufficiently dispersed in the inner portion of the fine particle. Further, through external addition and mixing 10 g of titanium dioxide with a particle size of 0.20$\mu$ and a BET specific surface area of 10 m$^2$/g was attached onto 1 kg of the core particles. The core particles were thrown into an aqueous solution of 12 g of a styrene/diethylamino methacrylate copolymer as the shell material resin dissolved in 1 kg of DMF, and cold water was added slowly to the mixture under sufficient stirring by means of a Homomixer (produced by Tokushu Kika K.K.). On completion of precipitation of the shell material (thickness: 0.3$\mu$), filtration and washing with water were repeated by means of a centrifugal filtrating machine, and the product was dried thoroughly at 40° C. When the product was observed by an electron microscope, it was found that the microcapsule toner obtained consisted of core particles coated uniformly with the shell material with titanium oxide present in the vicinity of the surfaces of the core particles.

To 100 g of the encapsulated toner powder obtained, 0.5 g of a wet process silica was added, and the resultant mixture was stirred and subjected to screening. Then, image formation was carried out with the use of this toner powder by a modified PC-20 copying machine produced by Canon K.K. equipped with an OPC photosensitive member and a urethane rubber cleaning blade. When successive copying test was conducted for 3,000 sheets, good images could continuously be obtained.

EXAMPLE 11

| | |
|---|---|
| Paraffin wax (m.p. 70° C.) | 60 wt. parts |
| Carnauba wax (m.p. 80° C.) | 40 wt. parts |
| Carbon Black (Raven 3500) | 4 wt. parts |
| Magnetite subjected to hydrophobicity treatment | 70 wt. parts |

The above mixture was melted and dispersed by means of the MKM mixer and the attritor similarly as in Example 10, and then further dispersed with addition of 5 parts by weight of N-dodecyldimethylamine for 30 minutes. Next, in substantially the same manner as in Example 10, 20 liter of water and 30 g of silica (Aerosil #300) were placed in a 20-liter Agihomomixer and the mixture was pre-heated to 95° C. Into the thus preheated dispersing medium, 2 kg of the above molten product was thrown and granulated under stirring at a circumferential speed of 17.5 m/sec. to obtain fine particles with a number average particle size of 7.8 $\mu$m and a weight average particle size of 12.5 $\mu$m after about 20 minutes. The product was subjected to the same post treatment as in Example 10 and dried to obtain core particles. When the particles were observed similarly, no magnetic material was found present on the core particle surfaces but well dispersed within the core particles.

After the hydrophobic wet process silica (BET specific surface area: 120 m$^2$/g) was attached to the core particles according to the same method as in Example 10, the core particles were encapsulated and applied with the post treatment, as described in Example 10, to give a dried microcapsule toner. When the product was observed by an electron microscope, it was found that the microcapsule toner obtained had silica attached in the vicinity of the surfaces of core particles.

What is claimed is:

1. An encapsulated toner for developing electrical latent images, comprising:
   a core particle defining a diameter, said core particle containing at least a colorant or magnetic powder, and a soft solid material;
   non-magnetic inorganic fine particles embedded within said core particle substantially from the outer surface thereof to a depth of about one-fifth of the core particle diameter, said inorganic fine particles being attached in an amount of from 0.1 to 10 wt. %, based on said core particle; and
   a shell coating said core particle and said inorganic fine particles.

2. An encapsulated toner according to claim 1, wherein said soft solid material comprises a binder with a melt viscosity of 1 to 100 cps at 100° C.

3. An encapsulated toner according to claim 1, wherein said inorganic fine particles are non-magnetic fine particle and have a specific surface area of 0.5 to 500 m$^2$/g according to the BET method by nitrogen gas adsorption.

4. An encapsulated toner according to claim 3, wherein the inorganic fine particles are non-magnetic fine particles and have a specific surface area of 50 to 400 m$^2$/g according to the BET method by nitrogen gas adsorption.

5. An encapsulated toner according to claim 1, wherein the inorganic particles have been embedded within the core particle through mixing in a dry system.

6. An encapsulated toner according to claim 5, wherein the inorganic particles have been embedded within the core particle through mixing in a dry system under heating.

7. An encapsulated toner according to claim 1, wherein the inorganic fine particles are embedded within the core particle in an amount of 0.2 to 5 wt. % based on the core particle.

8. An encapsulated toner according to claim 7, wherein the inorganic fine particles are present at a proportion of 90% or higher embedded within and a depth of 1/5 of the diameter from the surface of core particle.

9. An encapsulated toner according to claim 1, wherein the shell is formed by the phase separation method.

10. An encapsulated toner according to claim 9, wherein the shell has a thickness of 0.05 to 1.0$\mu$.

11. An encapsulated toner according to claim 10, wherein the shell has a thickness of 0.1 to 0.6$\mu$.

12. An encapsulated toner according to claim 1, wherein the shell has an external additive for electrophotography as free particles on the outer surface of the shell.

13. An encapsulated toner according to claim 12, wherein the external additive for electrophotography is a charge controller, an agent for imparting free-flowing property or an abrasive.

14. An encapsulated toner according to claim 13, wherein the external additive for electrophotography is hydrophobic dry process silica particles or wet process silica particles.

15. An encapsulated toner according to claim 1, wherein the inorganic fine particles comprise powder or particles of a material selected from the group consisting of silica, titanium oxide, silicon carbide, alumina, zirconia, titanium carbide and boron nitride.

16. An encapsulated toner according to claim 15, wherein the inorganic fine particles comprise fine silica particles treated with an amino-modified silicon oil having amine in the side chain.

17. An encapsulated toner according to claim 15, wherein the inorganic fine particles comprise titanium oxide treated with a titanium coupling agent.

18. An encapsulated toner according to claim 1, wherein the soft solid material comprises 30 wt. % or more of a wax or low molecular weight polymer exhibiting a melt viscosity at 100° C. of 1 to 100 cps.

19. An encapsulated toner according to claim 1, wherein the soft solid material comprises a wax selected from the group consisting of paraffin wax, polyethylene wax, microcrystalline wax, carnauba wax and polypropylene wax.

20. An encapsulated toner according to claim 1, wherein said core particle diameter is from 1 to 50 μm and the shell has a thickness of 0.05 to 1.0 μm.

21. An encapsulated toner according to claim 20, wherein the core particle diameter is from 5 to 20 μm.

22. An encapsulated toner according to claim 20, wherein the shell has a thickness of 0.1 to 0.6 μm.

23. An encapsulated toner according to claim 1, wherein the soft solid material contains at least 30 wt. % of a wax or low molecular weight polymer exhibiting a melt viscosity of 1 to 100 cps at 100° C.

24. An encapsulated toner according to claim 23, wherein the soft solid material contains from 50 to 95 wt. % of the wax or low molecular weight polymer.

25. An encapsulated toner according to claim 24, wherein the wax or low molecular weight polymer exhibits a melt viscosity of 1 to 30 cps at 100° C.

26. An encapsulated toner according to claim 1, wherein the inorganic fine particles are treated with a hydrophobicity-imparting agent selected from the group consisting of a silane coupling agent, a titanium coupling agent, a silicone oil and an amino-modified silicone oil having amine in the side chain.

27. An encapsulated toner according to claim 15, wherein the inorganic fine particles are treated with a hydrophobicity-imparting agent selected from the group consisting of a silane coupling agent, a titanium coupling agent, a silicone oil and an amino-modified silicone oil having amine in the side chain.

* * * * *

UNITED STATES PATENT AND TRADEMARK OFFICE
CERTIFICATE OF CORRECTION

PATENT NO. : 4,740,443
DATED : April 26, 1988
INVENTOR(S) : TOSHIAKI NAKAHARA, ET AL.

Page 1 of 2

It is certified that error appears in the above-identified patent and that said Letters Patent is hereby corrected as shown below:

COLUMN 3

Line 68, "plar" should read --polar--.

COLUMN 5

Line 4, "to" should be deleted.
Line 26, "powder" should read --powders--.

COLUMN 11

Line 30, "clean" should read --clear--.

COLUMN 12

Line 59, "trade name: AL-M," should read --trade name: Al-M,--.

COLUMN 13

Line 12, "dosa" should read --soda--.
Line 45, "carried," should read --carried--.

UNITED STATES PATENT AND TRADEMARK OFFICE
CERTIFICATE OF CORRECTION

PATENT NO. : 4,740,443

DATED : April 26, 1988

INVENTOR(S) : TOSHIAKI NAKAHARA, ET AL.

It is certified that error appears in the above-identified patent and that said Letters Patent is hereby corrected as shown below:

COLUMN 14

Line 38, "particle" should read --particles--.
Line 60, "of core" should read --of the core--.

Signed and Sealed this

Fourth Day of October, 1988

Attest:

DONALD J. QUIGG

Attesting Officer

Commissioner of Patents and Trademarks